March 19, 1929. E. D. FAHLBERG 1,705,639
BEATER
Filed April 13, 1925
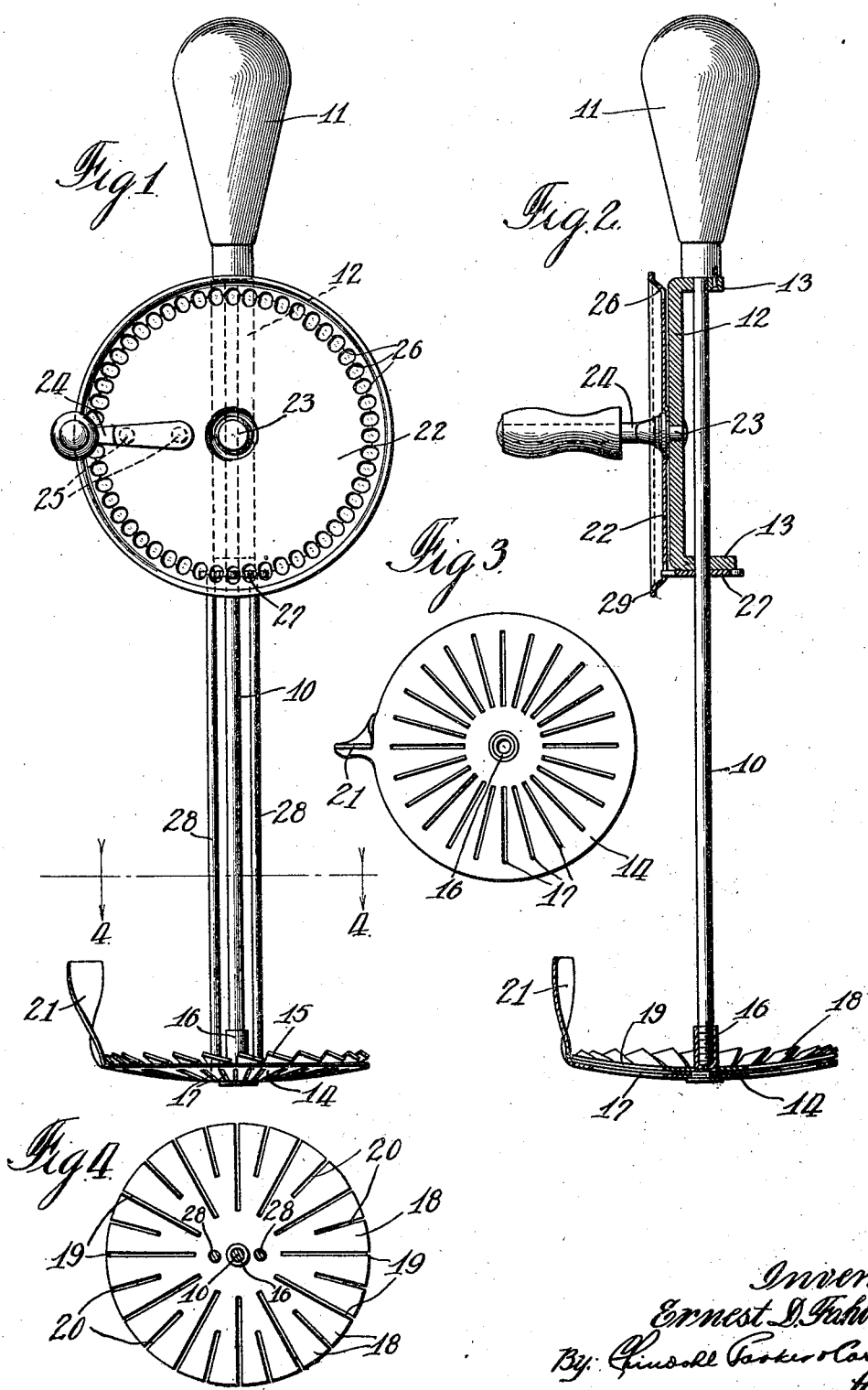

Patented Mar. 19, 1929.

1,705,639

UNITED STATES PATENT OFFICE.

ERNEST DAVID FAHLBERG, OF MADISON, WISCONSIN, ASSIGNOR TO E. D. FAHLBERG MFG. COMPANY, OF MADISON, WISCONSIN, A CORPORATION OF WISCONSIN.

BEATER.

Application filed April 13, 1925. Serial No. 22,531.

The invention relates to improvements in beaters adapted to be used for culinary purposes, such as whipping cream and eggs, and has for its primary object the provision of a new and improved beater of the above character which is simple and inexpensive in construction, and which is efficient in operation.

Another object is to provide a new and improved liquid beater or whip which is adapted to apply an extensive and effectual shearing force on the liquid, thereby serving to divide the liquid into very minute particles and to cause a large amount of foaming, and resulting in a substantial saving in time and in an improved finished product.

A further object resides in the provision of means for impeding the movement of the swirling liquid about the beater and for directing said liquid back into the vortex so that all portions will be acted upon uniformly.

Another object is to provide a beater which is easy to handle and operate, and which can be readily and quickly assembled and disassembled to facilitate cleaning.

Further objects and advantages will become apparent as the description proceeds.

In the accompanying drawings,

Figure 1 is a front elevational view of a beater constructed according to my invention.

Fig. 2 is a side elevational view thereof with the beater head shown in section.

Fig. 3 is a plan view of the stationary disk forming part of the beater head.

Fig. 4 is a sectional view taken in the plane of line 4—4 of Fig. 1.

While the invention is susceptible of various modifications and alternative constructions, I have shown in the drawings and will herein describe in detail the preferred embodiment thereof, but it is to be understood that I do not thereby intend to limit the invention to the specific form disclosed but intend to cover all modifications and alternative constructions falling within the spirit and scope of the invention as expressed in the appended claims.

In the exemplary embodiment of the invention shown in the drawings, the frame of the beater comprises a long stationary rod 10, a suitable handle 11 on the upper end of said rod, and a bracket 12 having bent ends 13 through which said rod extends. The upper end 13 of the bracket 12 is rigidly secured to the rod 10 and the handle 11.

Mounted on the lower end of the rod 10 is a beater head consisting of a stationary bottom plate in the form of a disk or dish 14 and a rotatable fan or propeller member 15. The dish 14 is provided with a central base plug 16 which is adapted to rest on the bottom of the container (not shown) for the material to be whipped, and the shank of which is threaded onto the lower end of the rod 10. The dish 14 is also formed with a plurality of openings of any suitable shape through which the material to be whipped is adapted to be forced by the fan member 15. In the present instance these openings are a plurality of closely spaced and long radial slots 17.

The fan or propeller member 15 is rotatably mounted on the shank of the plug 16 directly over and next to the dish 14, and is provided with a plurality of inclined blades, vanes or fins 18. These vanes in the present instance are formed by a plurality of alternately long and short radial slots 19 and 20 cut in from the periphery of the fan member 15.

I have found that the best results are obtained when the slots 17, 19 and 20 are narrow and are formed with sharp edges instead of being rounded, and when the dish 14 and the fan member 15 are positioned closely together, thereby resulting in increased shearing power.

Extending up from one side of the dish 14 and preferably formed integral therewith is a baffle plate 21 which when the beater is in use is positioned in the path of the liquid swirling about the beater and around with the fan member 15. The plate 21 is shaped to direct the swirling liquid into the vortex to pass it through the beater head, and also shaped to so direct the liquid that in its fall it will imprison and carry along small particles of air, thereby resulting in a large degree of foaming.

Any suitable means may be provided for driving the fan member 15. In the present instance, a large gear 22 is journaled on a stud 23 secured to the back of the bracket 12, and is provided with a suitable handle 24. Preferably the stud 23 is riveted to the bracket 12, and the handle 24 is formed integral with a plurality of bosses 25 riveted to the gear 22. The gear 22 has a plurality of holes or slots 26 stamped therethrough next to its periphery which slots mesh with a pinion 27 rotatably mounted on the rod 10 just below the lower bent end 13 of the bracket 12. The pinion 27 is rigidly connected to the fan member 15 by means of two parallel rods 28 extending along opposite sides of the rod 10 and adapted to be revolved about the latter.

The metal at the periphery of the gear 22 is bent at the slots 26 into the form of a flange 29 extending away from the bracket 12. The outer ends of the slots 26 thus extend into a plane beyond the pinion 27, and permit the latter to be moved axially into and out of engagement with the gear 22, thereby facilitating the assembly and dis-assembly of the beater.

It will be seen that I have provided a simple and inexpensive beater which is efficient in operation and which will beat material such as cream and eggs in a very short time. The beater has unusual shearing powers and causes a large amount of foaming. All of the material being whipped or beaten is worked on uniformly, thereby resulting in a homogeneous and improved product.

I claim as my invention:

1. A beater having, in combination, a stationary frame, a disk rigidly secured to the lower end of said frame, said disk having a plurality of radial slots, a fan member having a plurality of inclined blades rotatably mounted directly over and next to said disk, and adapted to force liquid against said disk and means for rotating said fan member.

2. A beater having, in combination, a frame, a disk having a plurality of radial slots mounted on the lower end of said frame, a propeller member having a plurality of vanes mounted on the lower end of said frame directly over said disk, and means for rotating said propeller member.

3. A beater having, in combination, a frame, a stationary dish-shaped member mounted on the lower end of said frame, said member having a plurality of slots, a propeller member rotatably mounted on said frame next to said disk, said propeller member having a plurality of slots cut in from the periphery and having the metal between said slots bent to constitute blades, and means for rotating said propeller member.

4. A beater having, in combination, a frame, a foraminated member rigidly secured to the end of said frame, a propeller having a plurality of peripheral vanes rotatably mounted on said frame next to said member, said propeller and said member being positioned closely together, baffle means mounted at one side of said member and said propeller for impeding the swirl of the liquid, and means for rotating said propeller.

5. A beater having, in combination, a frame, a disk removably secured to the lower end of said frame, said disk having a plurality of openings therethrough, a propeller member rotatably mounted on said frame directly over said disk, means for rotating said propeller member, and a baffle plate secured to said disk and extending upwardly past said propeller member, said baffle member being adapted to direct the swirling liquid into the vortex.

6. A beater having, in combination, a member having a plurality of openings therein, a propeller member rotatably mounted over said first mentioned member, said propeller member being shaped to force liquid through said openings, means for rotating said propeller member, and means for directing liquid into the vortex caused by the rotation of said propeller member.

7. A portable beater adapted to be positioned in and to rest on the bottom of a container having, in combination, a frame, a stationary bottom plate on the lower end of said frame and having a friction surface adapted to shear liquid, a propeller member having a plurality of inclined vanes rotatably mounted on said frame over said plate for forcing liquid against said surface, and means for rotating said propeller member.

8. A beater having, in combination, a frame, a propeller member rotatably mounted on said frame, said propeller member having a plurality of slots extending inwardly from the periphery, said slots being alternately long and short, the metal between the long slots being bent to constitute large blades and the metal between the long and short slots being bent to constitute supplemental blades, and means for rotating said propeller member.

9. A beater having, in combination, a bottom plate having a plurality of long narrow slots with sharp edges, a propeller member mounted over said bottom plate and having a plurality of vanes formed with sharp edges for forcing liquid through said slots, and means for rotating said propeller member.

10. A beater having, in combination, a frame, a bottom member on said frame, a propeller member rotatably mounted on said frame, said propeller member having vanes inclined upwardly and forwardly with respect to the direction of rotation, and being adapted to cause the flow of liquid in a downward axial direction against said bottom member, and a baffle member supported by said bottom member at one side of said propeller member, said baffle member being twisted to form a baffle surface inclined from the vertical so as to direct liquid into the vortex caused by the rotation of said member and to lift the liquid so that a substantial amount of air is entrapped by the falling liquid.

11. A beater, having, in combination, a frame, a stationary member on said frame, said member having a plurality of sharp edges adapted to shear the liquid, a rotatable member on said frame over said first mentioned member and adapted to force liquid against said edges, and means for rotating said member.

12. A beater having, in combination, a frame, a disk on said frame having a plurality of slots extending generally from the center outwardly toward the periphery, said disk being concaved upwardly, a propeller member having a plurality of inclined blades mounted on said frame over said disk, said propeller member being concave upwardly, and means for rotating said propeller member.

13. A beater having, in combination, a frame consisting of a stationary rod, a bottom member secured to the lower end of said rod, a propeller member rotatably mounted on said rod directly over said bottom member, a pair of parallel rods extending parallel to and along opposite sides of said first mentioned rod, the lower ends of said last mentioned rods being secured to said propeller member, a drive element rotatably mounted on said first mentioned rod, and rigidly connecting the upper ends of said last mentioned rods, and means for rotating said drive element.

14. A beater having, in combination, a frame, a bottom member secured to the lower end of said frame, a propeller member rotatably mounted on said frame over said bottom member, and a baffle plate struck up from said bottom member and having a free end terminating above said propeller member, said baffle member having a baffle surface inclined from the vertical for lifting the swirling liquid to aerate the latter.

In testimony whereof, I have hereunto affixed my signature.

ERNEST DAVID FAHLBERG.